(12) United States Patent
Lehmann, Jr. et al.

(10) Patent No.: US 8,477,778 B2
(45) Date of Patent: Jul. 2, 2013

(54) APPLYING MULTICAST PROTOCOLS AND VPN TUNNELING TECHNIQUES TO ACHIEVE HIGH QUALITY OF SERVICE FOR REAL TIME MEDIA TRANSPORT ACROSS IP NETWORKS

(75) Inventors: L. Curtis Lehmann, Jr., Houston, TX (US); Thomas A. Dye, Austin, TX (US)

(73) Assignee: Meetrix Corporation

( * ) Notice: Subject to any disclaimer, the term of this patent is extended or adjusted under 35 U.S.C. 154(b) by 5 days.

(21) Appl. No.: 12/237,286

(22) Filed: Sep. 24, 2008

(65) Prior Publication Data

US 2009/0016347 A1    Jan. 15, 2009

Related U.S. Application Data

(63) Continuation of application No. 10/772,012, filed on Feb. 4, 2004, now Pat. No. 7,444,425.

(60) Provisional application No. 60/453,312, filed on Mar. 10, 2003.

(51) Int. Cl.
*H04J 3/26* (2006.01)
*H04L 12/54* (2006.01)

(52) U.S. Cl.
USPC .......................................... 370/390; 370/432

(58) Field of Classification Search
USPC ......................................... 370/312, 390, 432
See application file for complete search history.

(56) References Cited

U.S. PATENT DOCUMENTS

| | | | |
|---|---|---|---|
| 6,640,251 B1 | 10/2003 | Wiget et al. | |
| 6,751,477 B1 | 6/2004 | Alperovich et al. | |
| 6,788,681 B1 | 9/2004 | Hurren et al. | |
| 6,870,842 B1 | 3/2005 | Caronni et al. | |
| 6,977,929 B1 | 12/2005 | Caronni et al. | |
| 7,724,744 B2 * | 5/2010 | Shur et al. | 370/401 |
| 2002/0029350 A1 * | 3/2002 | Cooper et al. | 713/200 |

(Continued)

FOREIGN PATENT DOCUMENTS

WO    WO 03003665 A1    1/2003

OTHER PUBLICATIONS

Higgins, L. et al., "Tunneling Multicast Traffic Through Non-Multicast Aware Networks and Encryption Devices," MILCOM 2001. Proceedings. Communications for Network-Centric Operations: Creating the Information Force, McLean, VA Oct. 28-30, 2001; IEEE Military Communications Conference, New York, NY: IEEE, US, vol. 1 of 2, Oct. 28, 2001, pp. 296-300.

(Continued)

*Primary Examiner* — Marsha D Banks Harold
*Assistant Examiner* — Matthew Campbell
(74) *Attorney, Agent, or Firm* — Michael A. Kerr; Kerr IP Group, LLC (57) ABSTRACT

As prior art systems fail to produce end-to-end transport and routing mechanisms capable of secure, accurate, and timely delivery of real-time media, the present invention prescribes the method and process to facilitate server-less, IP based sessions across all of public and private network infrastructure without regard for network hardware or carrier makeup. The method and process claimed herein defines the application of well known standards in a unique fashion so as to facilitate transportation of TCP and UDP packets associated with a real-time multicast session in a secure manner while achieving unencumbered access through firewalls and across multiple carrier, public networks through IPSec based virtual networking.

10 Claims, 5 Drawing Sheets

U.S. PATENT DOCUMENTS

2003/0110288 A1    6/2003   Ramanujan et al.
2003/0137976 A1    7/2003   Zhu et al.
2003/0147392 A1*   8/2003   Hayashi et al. ............... 370/390
2006/0039388 A1*   2/2006   Shur et al. ..................... 370/401
2010/0228879 A1*   9/2010   Wiget et al. ................... 709/238

OTHER PUBLICATIONS

International Search Report, International Application No. PCT/US2004/007341, mailed Sep. 7, 2004.

* cited by examiner

APPLYING MULTICAST PROTOCOLS AND VPN TUNNELING TECHNIQUES TO ACHIEVE HIGH QUALITY OF SERVICE FOR REAL TIME MEDIA TRANSPORT ACROSS IP NETWORKS

PRIORITY CLAIM

This application is a continuation of U.S. non-provisional application Ser. No. 10/772,012, now U.S. Pat. No. 7,444,425, titled, "APPLYING MULTICAST PROTOCOLS AND VPN TUNNELING TECHNIQUES TO ACHIEVE HIGH QUALITY OF SERVICE FOR REAL TIME MEDIA TRANSPORT ACROSS IP NETWORKS" filed Feb. 4, 2004, which claims benefit of priority of U.S. provisional application Ser. No. 60/453,312 titled "THE METHOD AND PROCESS OF APPLYING MULTICAST PROTOCOLS AND VPN TUNNELING TECHNIQUES TO ACHIEVE HIGH QUALITY OF SERVICE FOR REAL TIME MEDIA TRANSPORT ACROSS IP NETWORKS" filed Mar. 10, 2003, whose inventors are Curtis Lehmann and Thomas A. Dye, which is hereby incorporated by reference in its entirety.

FIELD OF THE INVENTION

The present invention relates to computer system and network architecture and more particularly to real time, multipoint communications for collaboration and media exchange over public and private EP networks.

DESCRIPTION OF THE RELATED ART

Legacy conferencing systems have enabled users to communicate with a limited scope of functionality since their introduction in the early 1980's. The systems employed transport mechanisms that while robust, were expensive to install, maintain and operate. Dedicated and/or switched lines (ISDN, T-1, T-3, ATM) or satellite broadband circuits employed for these conferencing systems were under-utilized and failed to provide recognizable returns on their recurring cost. Legacy conferencing hardware and infrastructure provided high quality audio and video but lacked features and functionality to facilitate true collaborative environments. Further, the installation and operations of these systems was very complex and thus negatively impacted effective use of the assets. The resulting lack of operational flexibility prohibited inclusion of extraneous sites or ad hoc use.

The recent emergence of Internet Protocol, packet based systems attempted to address the key issues of legacy systems but in themselves created additional issues. Unlike their predecessors, these systems produced substandard audio and video quality; frame rates declined as a result of packet loss, latency and sequencing issues. Complicating matters is the public and private infrastructure utilized to support these protocols and the very nature of the protocols themselves. Standard networking protocols such as H.323, video compression protocols such as MPEG, H.263, Motion JPEG and audio compression standards such as G.11 and H.729 were developed primarily for switched networks. Such standards are used in practice of the prior art but do not deliver acceptable performance and quality over Internet Protocol (IP) networks. Within the IP infrastructure, Hardware Multipoint Control Units (MCUs), data servers or software based conferencing servers negatively impact the protocols as each packet must be decoded (uncompressed), buffered for frame regeneration, mixed with corresponding frames data, re-encoded (compressed), and transmitted. In addition, if each packet is encrypted for security, the process includes at least one or more encryption and decryption step per data packet in transport. As this sequence takes place for each conference stream, the negative impact on performance and system scaling grows exponentially. Cost associated with IP based systems does not provide significant savings as the MCU and associated network infrastructure add assets and required additional conditioned communications channels and data center facilities to support the services.

Implementation of multipoint communications like multicast and broadcast have significant challenges due to infrastructure hardware manufacturers and public carriers. Manufacturer's inimitable implementation of standards to obtain perceived performance enhancements results in less than functional interoperability. Competing carriers implement opposing hardware and may, or may not, support transport of real-time (RTP) or streaming (RTSP) media via multicast or broadcast domains. Result of these proprietary implementations is the denial of end-to-end transport for real-time, multicast media across mixtures of public and/or private domains.

Prior Art Conferencing System Architecture

Prior Art system architectures comprise three distinct systems that comprising a unique set of hardware, software and protocols. These architectures, legacy, IP based servers, and multicast each achieve communications of audio and video to some extent. However, these prior art systems fail to address the need for a method of communication of not only audio and video but further data collaboration in an open, public environment while maintaining session security and optimizing the use of bandwidth in the communications path.

Figure 1:
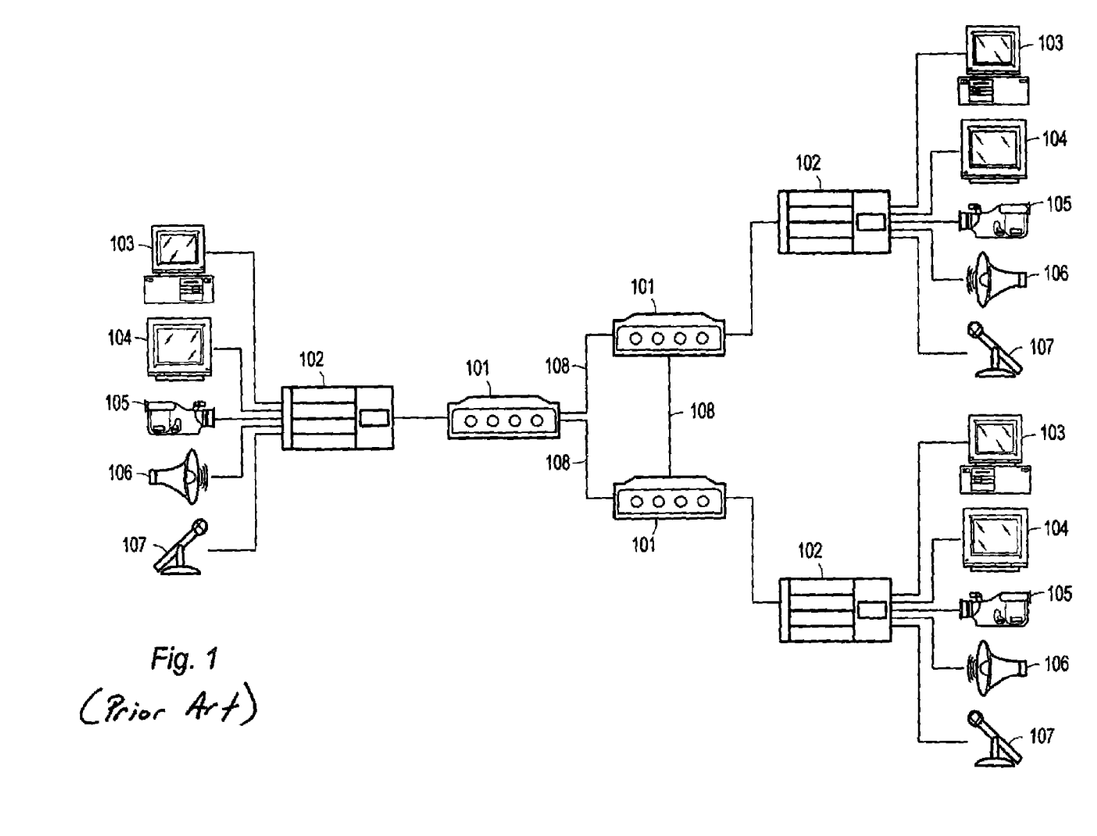
FIG. 1 illustrates the typical embodiment for prior art legacy conferencing systems.

FIG. 1 depicts the typical legacy system. Often referred to as conference room systems, Legacy systems deliver the highest quality audio and video, broadcast in nature, but require considerable capital outlay in initial and on-going operation. The extensive sole function hardware is proprietary in nature offering minimal, or difficult at best, cross platform functionality with other manufacturers and has no effective data collaboration functionality. The supporting communications networks are fixed assets requiring high levels of technical expertise for nominal maintenance and operation. Functionality across open, public networks is not supported, thus cost associated with the supporting communications network is very high as dedicated, sole function circuits are the foundation of the communication channel. As these circuits have no open connectivity and are limited to one application, security aspects of collaboration are not addressed. With limited functionality, no scaling factors, and difficult operations requiring very high resources in the form of capital, personnel, and communications network, this architecture falls short of the delivering robust, multi-point, open, media rich communications.

Figure 2:
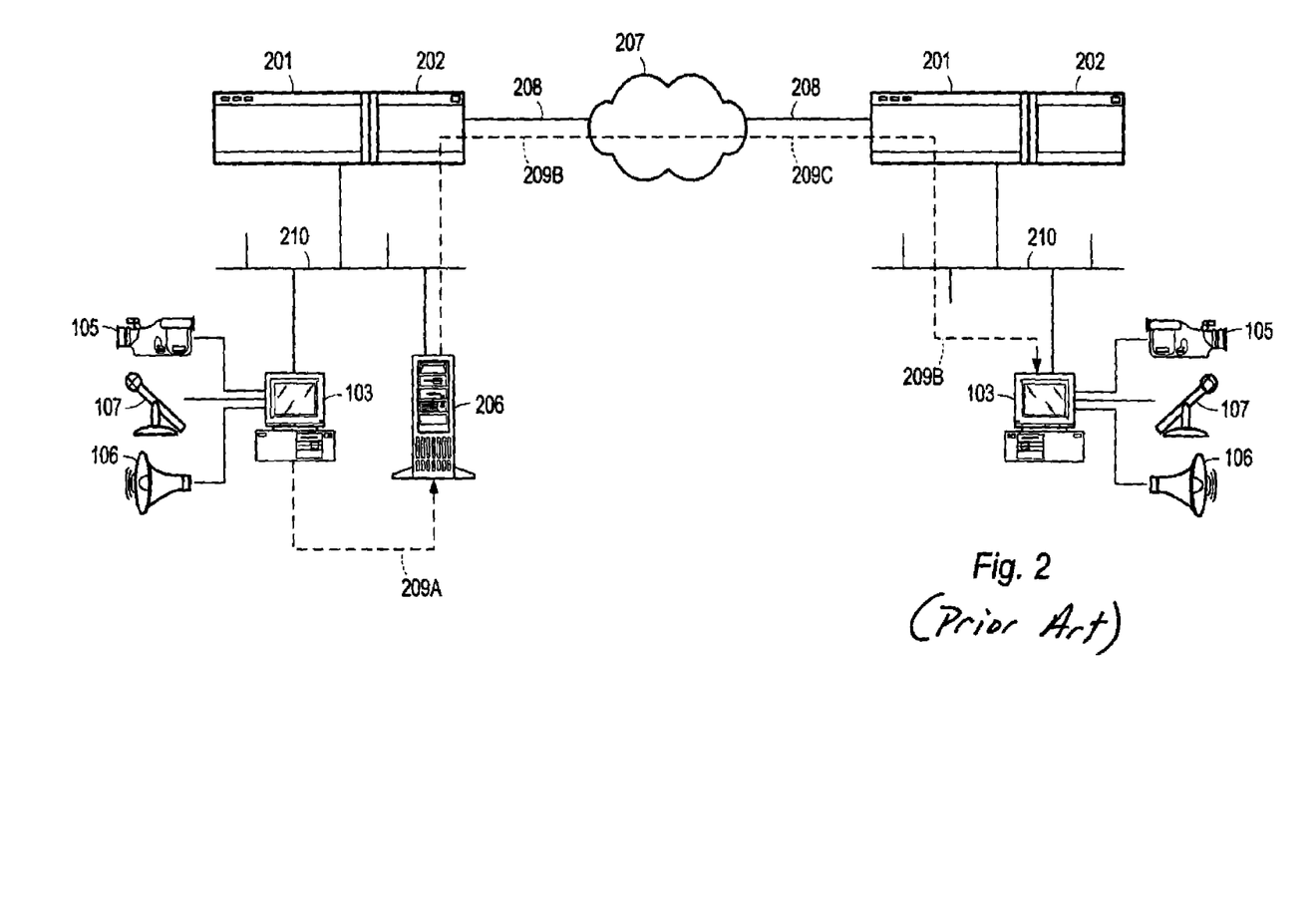
FIG. 2 illustrates the typical embodiment of the prior art IP-based, central server architecture.

FIG. 2 depicts a typical embodiment of a prior art IP sever based system. IP servers are capable of delivering audio and video but not of the quality of legacy systems. The majority of the IP server based solutions add data collaboration functionality and therefore meet the minimum requirements of enabling rich media exchange. As this architecture is Internet Protocol (IP) based it should lend itself well to open, multipoint communications but implementations have resulted in poor quality audio and video, issues with network resources including firewalls and bandwidth, and are not fully supported by network hardware manufacturers or communications carriers. The architectures transport protocols are connection-oriented TCP and connectionless oriented UDP. Connection oriented TCP is well supported by manufacturers and carriers but creates quality issues with real-time data requiring delivery acknowledgement of every packet. As networks only deliver packets based on "best effort", lost, late, or out of sequence packets cause considerable latency, as entire sequences must be retransmitted. Connectionless UDP transport is much better suited for real-time media but encounter issues with firewall and router transitions between networks; firewall policies often block UDP packets and routers apply Quality of Service (QoS) policies that slow or lower priority of the packet forwarding. Session security is minimal as it is based on user identification; there is no support for channel, communication path integrity or authentication. Network resources, most notably bandwidth, are significantly impacted during operation of IP server based conferencing and collaboration sessions. In prior art systems, each end point transmits all audio, video, and data to a central server where packets are duplicated and distributed back to all participants in the session. End points common to a network each receive a unique set of all the transmitted packets; as such, network convergence points are significantly impacted by the duplicate information flows. In effect, the network access points with the least bandwidth will be heavily impacted resulting in poor network performance and poor quality audio, video, and application response. Lastly, the IP based servers common resources, processor and memory, are limited in supply. The demand to decode, duplicate, re-encode and transmit each packet received and requested by end points taxes server resources and limits scale and scope of sessions. As resources are taxed, server performance degrades adding additional latency to the already latent rich process and again, quality of the real-time media is negatively impacted.

Figure 3:
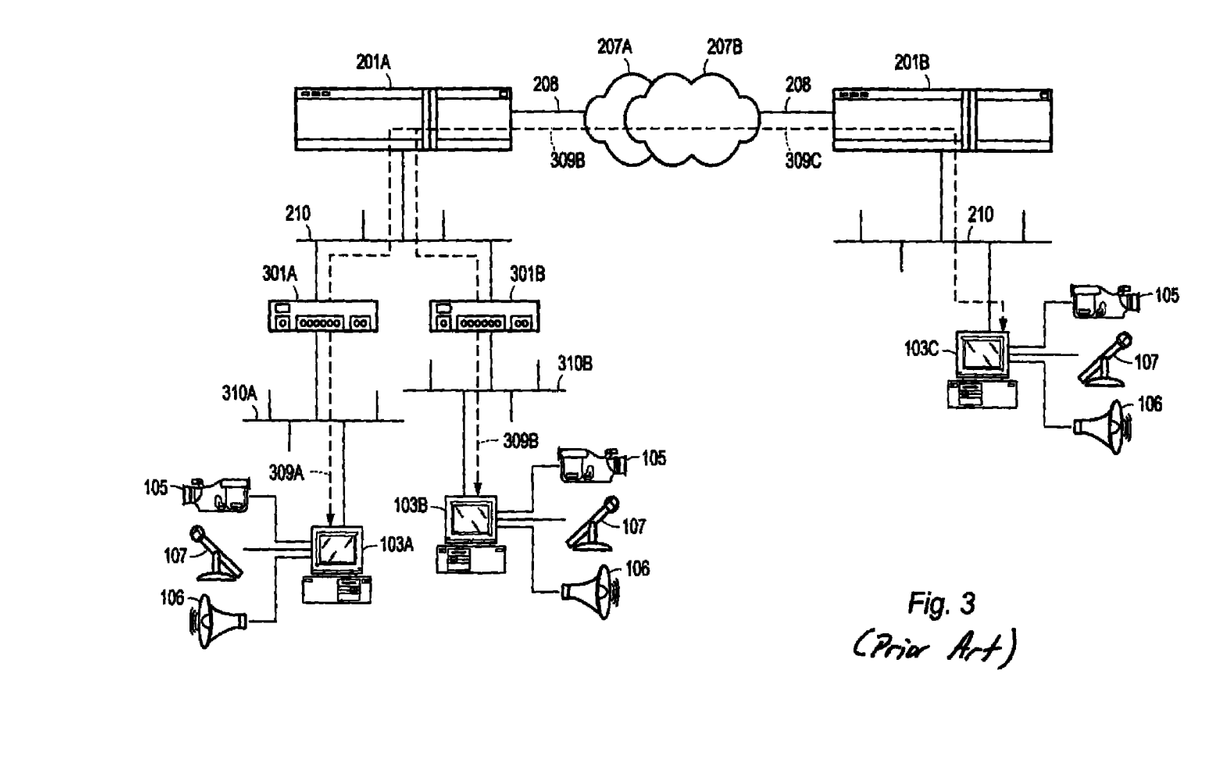
FIG. 3 illustrates the typical embodiment of the prior art IP-based, multicast system architecture.

FIG. 3 depicts a typical multicast based system. The Multicast enabled system allows for audio, video, and data collaboration within local or limited scope private networks. This architecture is focused on the efficient use of network resources with the largest impact being on saving bandwidth. The protocol architecture supports both TCP and UDP but has significant limitations and exposures when applications require a communications path traversing dissimilar manufacturer hardware or carrier networks. Internet Engineering Task Force (IETF) standards clearly define the protocol yet network hardware manufacturers implementation and interpretation vary in attempt to enhance the service and subsequently lock-in customer base. The lack of homogeneous standard implementation affect public and private networks including the Internet. Public network providers, carriers, select protocols they will support and again, the lack of a homogeneous standards implementation affect application performance. At any network instance or port, the lack of multicast protocol support or deviation of the Multicast protocol standard may result in packet loss or total communication path interruption. No part of the multicast architecture addresses end point authentication or session security as it relies upon IP routing of TCP and UDP packets. All packets must be transmitted and received "in the clear" or unencrypted. Therefore, a low cost system is highly desired that can achieve high quality of service in a secure network environment running over public or private IP networks that is not dependent on a central server for real-time data distribution and whereby such real-time data remains in the network at all times during transport to multiple end points.

SUMMARY OF THE INVENTION

Various embodiments of a system and method are disclosed to enhance the quality of service during the transmission of real-time protocols (RTP, RTSP) over combinations of public and private IP networks. One embodiment preferably encompasses IPSec-based virtual private network (VPN) tunneling applied as a logical or soft network adapter where additionally, Internet Group Management (IGMP) and Distance Vector Multicast Routing Protocol (DVMRP) instances are asserted. An alternate embodiment includes functionality similar to the logical/soft client but embedded into a hardware solution. In other embodiments both software and hardware components may be shared between PC application software and associated network hardware to accomplish aspects of this invention. In one embodiment, end-to-end Quality of Service (QoS) is achieved through establishment of IPSec-based tunneling systems formulating a Virtual Private Network, where clients connect via multiple topologies including peer-to-peer, hub and spoke, or a meshed system. Multicast protocols, e.g., IGMP and DVMRP, may be applied to physical and logical instances of IPSec tunnel ports. One embodiment of the present invention eliminates latency associated with multipoint, real-time media by facilitating the establishment of a secure, media-enabled, opaque network where clients can intermix audio, video and data. This is accomplished by using a multicast address attached to a single payload and routing the transport to multiple remote clients through the private tunnels. One embodiment uses a novel method of inserting multicast protocol instances, IGMP and DVMRP, as a routing and transport mechanism at each instance of an IPSec-based VPN tunnel port. By attaching a multicast address to the media payload, only a single packet is transmitted allowing potential remote clients or locations within these established virtual private network a choice in media selection. Manufacturer and public carrier's inability to reliably communicate multicast or real-time media is eliminated, as the transport network is in effect, an opaque tunnel. Thus, IPSec packets are routed end-to-end, apart from the media payload. QoS is established because the media data payload never leaves the network during transport. Thus, performance is enhanced eliminating delays associated with application software that manipulates the media data as found in prior art systems. Thus, embodiments of the present invention operate to use multicasting addressing and private tunnels to achieve full duplex, real-time, low-cost secure audio and video data transport across IP networks.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Conferencing System Architecture of the Preferred Embodiment

Various embodiments of the present invention address the failures of prior art systems with the intent of uniquely enabling high quality, real-time, media rich communication sessions that are inherently secure. These embodiments facilitate this communication and its associated communications channel/paths through multiple public and private networks using security based on industry standards. Industry based security standards eliminate issues associated with traversing firewalls, multiple and/or dissimilar carrier networks, and multiple private networks, regardless of the network manufacturer's hardware encountered therein. As the transport uses standards based security protocols, end point authentication and channel encryption are inherent. Lastly, the system and method (the "method") described herein efficiently utilizes network resources, most specifically bandwidth in the ingress and egress of public and private networks and peering points within Local Area Networks (LANs).

The method includes application of multicast routing protocols, Internet Group Management Protocol version 2 (IGMPv.2) and Distance Vector Multicast Routing Protocol (DVMRP) within an ingress or egress instance of an IP Security Protocol (IPSec) based tunnel. The method includes a unique application of multicast route and transport preferably through IPSec based virtual private networks which enables real-time sessions of TCP and/or UDP to traverse dissimilar networks, hardware, and carriers by effectively masking the those packets within the opaque tunnels of the virtual network.

The method may be applied to endpoints, ingress/egress network access points, and network hardware infrastructure. As such, the method may be implemented as hardware or software dependent upon session, network, and/or application requirements. In the preferred embodiment, the method could be applied to end points such as client Personal Computers (PCs) in a software application in the form of a logical network adapter. Associated with the application is the required multicast routing protocols, hardware or software applications which integrate a public or private network to associate said multicast routing with specific IPSec based tunnel network connected to one or more remote peers. A multicast enabled application seeks the existence of session peers by broadcast of an IGMP packet with the Time-to-Live (TTL) bit set to one. Local peers or end points respond by transmitting and receiving via the IGMP supplied multicast address and ports and/or hardware instances forward to adjacent peers. Should there be no reply, the application retransmits the IGMP with TTL increased by one, repeating the process to N times as defined by the application. Hardware instances sensing additional end points or peers forward all traffic associated with the session to the next hop or in the absence of a session peer, stops forwarding session flow. Should multiple peers reply to a multicast/VPN instance, packets will be forwarded to the next hop but not duplicated as in prior art until the egress point of the virtual network has been traversed and the next hop is an end point whereby the enabled port will duplicate packets for each.

As noted above, videoconferencing systems of the prior art have conventionally focused on standards such as H.323 for interoperability between multiple conference members. Recently, a new standard SIP or Session Interface Protocol has been used to define an improved connection standard. Both H.323 and SIP conferencing standards use the concept of an Multipoint Control Unit (MCU) sometimes referred to as a conferencing bridge. FIG. 1 shows an example of a legacy multipoint conferencing system. Shown in FIG. 1, audio and video input capture devices such as microphones 107 and digitizing cameras 105 are connected to a computer or client device 102 for data conversion and processing. The client device 102 is connected to a local area network directly connected to a router 101. The router 101 is connected to a wide area network communication lines 108 which in turn connects to one or more routers 101 across public or private networks. The routers 101 are programmed with IP addresses and firewall rules which allow data connection in multipoint fashion to one or more client systems. Audio and video user data may be heard by Speaker output 106 connected to the client computer 102 and video and collaboration data may be viewed on the output monitor 104 connected to the client computer 102. In alternate embodiments of the prior art, additional client computers 103 may be used for display of collaboration data.

In the traditional conferencing system an MCU 101 may be configured to route and process multiple audio video streams. It is the responsibility of the MCU 101 to accumulate audio and video as direct streams from multiple users, process of such streams, and distribute the process streams back to multiple users. Again referring to the prior art system of FIG. 1, a computer or client device 102 is used to convert the real world analog inputs into a format capable of transport over analog or digital communication lines 108. Peripheral Interface devices connect into the client device 102 and are responsible for capturing audio 107 video 105 and displaying incoming video on a desktop or conference room monitor 104 along with broadcast of audio to a speaker 106. In the prior art legacy systems dedicated analog (switched) communications lines 108 are typically used for the transport of audio, video and collaboration data between remote users. In some of the more recent embodiments the communication lines 108 may be digital (packet switched) over public networks, private networks or over switched networks using data communication standards such as ISDN or even the plan old telephone system.

In addition to the conventional legacy systems as shown in FIG. 1, conferencing systems of the prior art may be based on central servers running Internet Protocol TCP/IP or UDP/IP as shown in FIG. 2. FIG. 2 indicates input capture devices for audio 107 and video 105 connected directly to a client computer 103 which may be a personal computer, workstation, embedded appliance or mobile device with wired or wireless connectivity. Client computer 103 may double as the output display device for video, possibly a replacement for the TV or monitor 104 indicated in the legacy system of FIG. 1. Client computer 103 may also process audio in preparation for delivery to the Speaker device 106. As indicated in FIG. 2, the client computer 103 is connected through a local area network 210 which connects to a network switch or hub 201 then connected to a local area network router 202. The router 202 is connected to a wide area network 208 which interfaces to the public Internet 207. In other embodiments of prior art systems the central server 206 model may be connected over one or more types of analog or digital communications lines 208 on public or private networks.

Again referring to FIG. 2, the preferred environment shows Internet packets of audio, video and collaboration data (payload) are shown in dashed lines traversing multiple network communication lines 208 over multiple public or private hops around the Internet cloud 207. Here the central server 206 may be connected to a local client over via a local area network 210 where the payload 209A traverses between a central server 206 and one or more a local clients 103. In the prior art, the central server 206 may connect payload information 209C which is transported between one or more routers 202 over the wide area networks 208 to once again traversing the local area network 210 in multipoint remote locations indicated in the payload connection 209B of FIG. 2. Thus, payload information 209A is transferred and processed by central server 206, propagated as payload information 209B and 209C over public or private networks 207 for delivery over local area networks 210 to one or more remote clients 103.

The purpose of the IP server 206 is to accumulate payloads from multiple remote sources, process those payloads and redistribute to one or more of the same sources. The central server 206 historically is the workhorse of the videoconferencing system. In the prior art the central server is responsible for decompression of audio video streams, mixing such streams in preparation for compression and transport to one or more remote clients 103. In the systems of the prior art as indicated in FIG. 1 and FIG. 2, increased costs and undesirable latency may be present while processing the payload on one or more central servers 206.

IP unicast packets are transmitted with a source and destination address, which enable routers to find a path from sender to receiver. Multicast addressing is a highly scalable network protocol which comprises a single content stream that is replicated by the network at branch points closest to the viewers. The result is a much more efficient use of bandwidth and a decrease in the load on content servers which allows an overall lower cost per user. IP multicast packets are transmitted with a source and group address, which extend this functionality to provide delivery to a set of receivers. Multicast routing protocols have distinct advantages for the instantiation of multiple connections based on a multicast group address used to address one or more receivers. As such multicast protocols are very suitable for conferencing or online chat/discussion groups. Recently, an increase in the use and implementation of multicast routing protocols have been defined as indicated in the multiple references listed herein. As known by those knowledgeable in the art, sending a multicast packet has little difference from sending a unicast packet. Receiving a multicast packet is quite different. In order to receive multicast packets, a host must tell its local router that it's interested in a particular multicast group address, which is defined in the Internet Group Management (IGMP) specification. The IGMP multicast specification follows the process whereby senders send to a multicast address or group of addresses as defined by the multicast protocol specification, the receivers express interest in one or more multicast addresses to local routers. Routers coordinate to replicate and deliver multicast addressed packets from senders to receivers. Replication takes place at the point closest to the receiver to minimize server load and network bandwidth. IP multicast enables efficient many-to-many datagram distribution. It is one of the basic building blocks of the Internet multimedia architecture. For most conferencing purposes, multicast offers a more economical alternative to unicast in delivering multimedia packets. However, as known in the art, since many of the routers on the internet today may not support multicast routing, or are specific or proprietary to a particular multicasting method or process, the use of multicasting over the open internet seems impractical.

Recently, the MBONE network was created to solve the multicast routing limitations using unicast protocol transport through internet routers. The MBONE architecture allowed all the hosts participating in a multimedia conference to tie together by means of tunneling. Thus, the MBONE architecture established an IP network of connections comprising at least two virtual network interfaces on two remote hosts communicating over Internet on a known protocol. In the prior art, once the MBONE virtual network was established, network traffic could flow from one host to the other through one or more tunnels as if they are on the same network. At each end of each of a plethora of tunnels, IP packets are encapsulated into unicast packets and then routed through the internet with the destination of the other virtual interface of the other host on the other end of the tunnel where the packet may be un-assembled to its original form. The MBONE network was specific to applications and required special protocol and hardware implications that did not proliferate or be adopted by the market for general use. Because unicast applications of the prior art suffered well-known scaling problems MBONE never really materialized as a viable solution. It is therefore beneficial to have a virtual network of tunnels that can connect to one or more IP address over standard network devices using a broadcasting protocol technique.

As noted above, FIG. 3 illustrates a multicast system as known in the prior art. Input devices such as the video capture device 105 audio capture device 107 indicated the interface to the terminal device(s) or PC computers 103A, 103B and 103C for continuing processing and digitization of captured audio and video data payload. Output devices such as speakers or headsets 106 are used to receive audio information from other members in the conference or meeting. Input capture devices such as camera 105 and audio microphone 107 also may connect into PC devices 103A, 103B and 103C for data conversion into a digital payload in preparation for transport across public or private networks. Payload (IP packets) may be transmitted from one or more local networks to one or more remote networks. Payload is created at the transmitter and terminated at the receivers. To illustrate a multicast operation shown in FIG. 3, the simple case of PC 103C as transmitter and receiver PCs 103A/103B are depicted. Connected to a local area network the PC or terminal device 103C connects to a local switch or router 201B via a local area network 210 which in turn is connected to a wide area network 208 which in turn connects to Internet clouds 207A/207B. In FIG. 3 the multicast environment is illustrated showing a termination device or router 201A which is responsible for forwarding of multicast information to one or more local area networks 210 which connects to one or more subnet switches 301A and 301B as illustrated in FIG. 3. The subnet switches 301A and 301B are connected to one or more subnets 310A/310B where each subnet connects to individual localized computer devices, terminals or PCs 103A/103B. The localized devices 103A/103B may be part of the multicast group used for termination or instantiation of the data payload.

FIG. 3 illustrates the creation of a multicast group where PCs 103A and 103B wish to be part of the multicast group and join with PC 103C. The transmission of group address from PC 103C includes the multicast group addresses for PCs 103A and 103B. Local to the networks connected to router 201A are PCs that are interested in joining the multicast group. Multicasting PCs are required to deliver to the router 201A their interest to participate in a multicast group. Once the multicast group is established a single payload with multiple IP addresses 309C may be transmitted via multicast router 201B to the network where one or more multicast routers 201A look for payload with the desired multicast group address as indicated previous in the IGMP or DVMRP protocol process. Once found by the router 201A, multicast addressed payload is duplicated and delivered to one or more listening devices. FIG. 3 depicts two such PC devices 103A/103B located within the direct network 309A, or subnet 310A/310B. Here the payload is terminated to the proper multicast PC device 103A/103B. Once the payload is delivered it is then digitally processed for audio and video output to a speaker or display monitor each of which is connected to the local PC's 103A/103B. Thus, multicast protocol of the prior art allows for one or more groups of client devices to decode the same payload for remote output insuring a minimum amount of network bandwidth and minimizing or eliminating the need for separate Media Control Unit (MCU) or central server for multi-point communication as illustrated in FIG. 2 of the present disclosure. Multicast specifications RFC 1112, host extensions for multicasting (IGMPv1), RFC 2236, Internet Group Management Protocol, (IGMPv2) are used during one to many or many to many IP broadcast across public or private networks. Prior art multicasting system for audio and video communication have not established a standard due to the necessity of all routers to be multicast enabled. Thus it is desirable to achieve public and private multicast operation that is independent of the need to have multicast enabled routers throughout the entire packet transport path.

In the present invention, payload transport is accomplished using multicast routing by placing a multicast routing instance on ingress or egress nodes of one or more virtual private networks. Embodiments of the present invention alleviate the requirement of having multicast enabled routers between internal nodes of the packet transport path by using a multicast address attached to a single payload and routing the transport to multiple remote clients through private virtual tunnels. In embodiments of the present invention a multicast delivery tree may be thought of as a broadcast delivery tree that has been pruned so that it does not extend beyond those sub networks that have members of the multicast destination group. Hence, datagram's are not forwarded along those branches which have no listeners of the multicast group. Payload data is forwarded along nets where one or more of the clients on the subsequent subnets indicated interest in one or more of the Multicast group addresses. Thus, multicast addressed packets are encapsulated within the private tunnel such that each tunnel node is specified as a multicast enabled router with specific instructions to construct and maintain the virtual tunnel for payload transport.

In one embodiment virtual private networks designed for multicast addressed payloads may be constructed in hardware for high connectivity and throughput. Alternate embodiments may be designed as firmware or software running in dedicated computer system. Hardware and software versions may be mixed and matched as necessary to accomplish configuration and cost goals.

Figure 4:
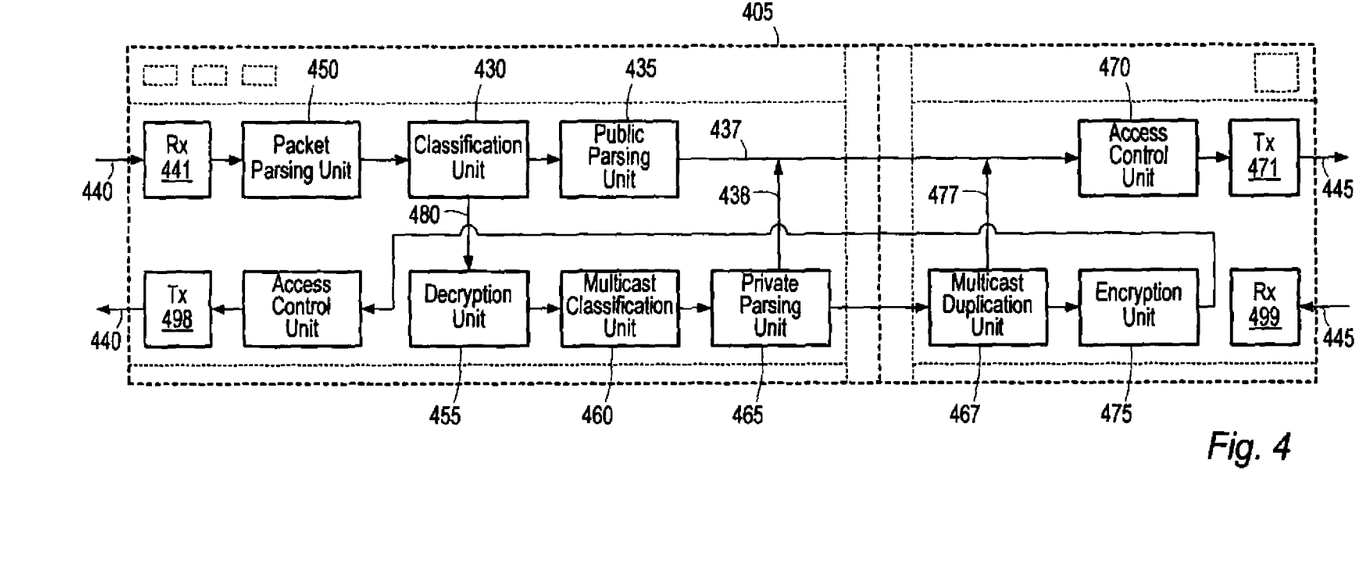
FIG. 4 illustrates the method and architecture for the functions of one embodiment of the invention.

FIG. 4 illustrates a hardware embodiment of the present invention. Alternate embodiments may include software running on PCs, servers or embedded devices. FIG. 4 illustrates a data concentrator device 405 used to classify, process, parse and secure public and private data packets in the preferred embodiment of the present invention. The data concentrator 405 is used to instantiate and terminate secure virtual private network interfaces between one or more local or remote client devices. Alternate embodiments may use other implementations to achieve the use of multicasting via virtual private networks. The concentrator 405 also has a combined public (open) and private (secure) interface connected preferably through one or more Local Area Networks. The LAN/WAN interfaces 440/445 may connect to one or more external firewalls, routers, switches, hubs, servers in one or more network configurations including but not limited to peer-to-peer, hub and spoke, or meshed systems. The embodiment of the data concentrator 405 preferably contains internal firewall, security and router capabilities for stand-alone operation without the need for other enterprise hardware. In addition to the necessary VPN and multicast capability, the data concentrator 405 may contain the control code to instantiate and tear down multicasting groups based on RFC-1112/RFC2236 IGMPv1/IGMPv2 multicasting management protocol. Not shown in FIG. 4 is the redundant duplicate logic for the reverse path receiver 498 and transmitter 498. It may be assumed that the present embodiment has a full duplex interface or duplicate logic or function is used to assure transmission is bi-directional within the concentrator device 405. The concentrator 405 of the present embodiment has both public and private payload classification. Thus, the data concentrator 405 may process and classify standard Internet data over both the public and virtual private domains. One or more data concentrators 405 may connect to one or more other data concentrators via local area networks or wide area networks directly or indirectly through a plethora of other hardware devices (hops) located along the transport paths. In one embodiment, one or more concentrator devices 405 establish a virtual private network between one or more hardware based concentrators or between one or more software based concentrators. In alternate embodiments both hardware and software concentrator devices may be mixed and matched to suit the needs of any particular requirement. Software based concentrator devices may run on standard PCs, servers, or embedded devices where the functions of data concentrator 405 are implemented in software. The transmitter 471 output port 445 typically connects to network switches or hubs over one or more local area networks (LANs). In one embodiment of concentrator 405, custom semiconductors are used with embedded logic performing the functions necessary to enable embodiments of the present invention. The receiver interface 441 interfaces to the packet parsing unit 450 prior to classification unit 430. The concentrator 405 classifies payload data into public or private, unicast or multicast packet types. Also, the concentrator may require packet decryption using private or public key methods known to one knowledgeable in the art. Two types are shown in the present embodiment, public packets 432 that are preferably TCP protocol based and private packets preferably UDP 480 protocol based. In alternate embodiments multiple packet types may be used. Public packet payloads are routed to the public parsing unit 435 for classification and lookups required for routing requirements. Once public packets have been processed they are qualified against the access control unit 470 prior to transmission through the transceiver output 471 and out to the Local Area Network interface 445.

Referring again to FIG. 4, private payload output 480 from the classification unit 430 is preferably decrypted by the decryption unit 455. Decryption occurs if the data from the private tunnel payload has been previously encrypted by concentrators located down-stream prior to transport. Output from the decryption unit 455 is classified as private and may be of a multicast payload type. In one embodiment private data that is not of the multicast group is typically file transfer or directory information typically transported on the virtual private network. Also, in one embodiment multicast group payload information typically contains real-time audio or video data or rtp/rtcp control. In some cases private non-multicast data is parsed for further transport up-stream, while in most or all cases, multicast payload that has expired the time to live count is terminated into one or more local client devices connected directly or indirectly to the concentrators 405 transceiver port 445. In one embodiment, if the multicast payload is terminated by more than a single client device connected to the transceivers local port 445 it must first traverse the multicast duplication unit 467. If the multicast payload is to be delivered to only a single client on the local port 445 then the multicast duplication unit may not duplicate the payload. In either case, the multicast data is sent to the access control unit 470 for further security checking. If the multicast payload is to be delivered to one or more up-stream consumers, it is preferably duplicated by the multicast duplication unit 467 and encrypted by the encryption unit 475 prior to re-entry to the wide area network. The Encryption unit 475 connects to the access control unit which is responsible for access of only qualified port and IP addresses. The access control unit 470 connects back to the network forwarding duplicated multicast addresses to other concentrators 405 on the world wide network. If there exists both consumer clients local to the concentrator 405 via network interface 445 and external to the local network connected through the transmitter 498 then multicast payload is duplicated as many times as needed and sent out both transmitters 471 and 496. Transmitter 471 sends non-encrypted multicast packets to local clients, while transmitter 498 forwards multicast payload to other devices located upstream from the concentrator 405. Thus, the concentrator 405 forms a network bridge for multicasting information within private virtual networks and doubles for a standard router/firewall for public payload transport. FIG. 4 shows one particular embodiment of the present invention. Alternate embodiments may be used to accomplish the same goals as described herein.

Figure 5:
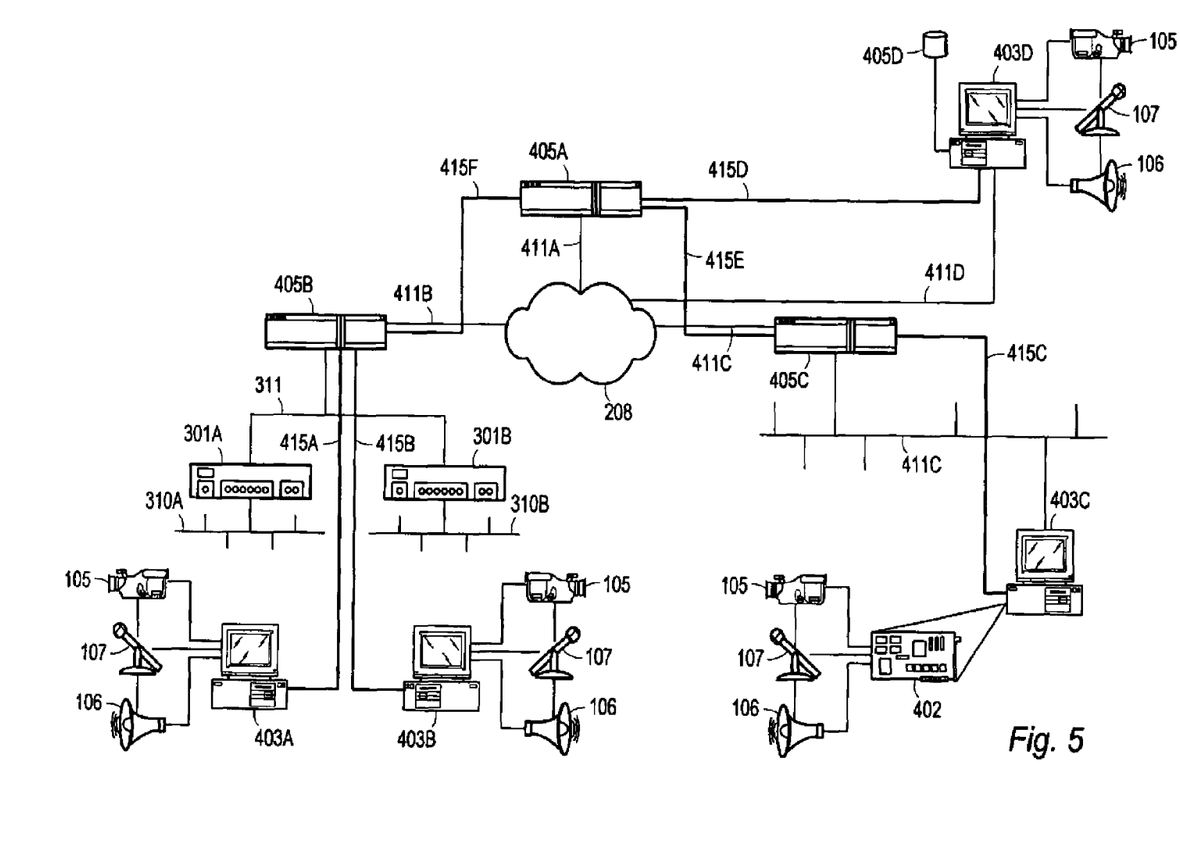
FIG. 5 illustrates one possible embodiment and method to establish secured, IP-based, multipoint media exchange between hardware and software implementations

FIG. 5 illustrates one embodiment of the present invention whereby a combination of logical or soft VPN tunnels are connected to multiple hardware instances of the VPN multicasting appliance (FIG. 4). One instance, termed a software only client, or "soft" client is used with secure software application running entirely on the PC 403D. Connected to the PC 403D a software application of the hardware concentrator described in FIG. 4 is running. FIG. 5 shows for each client one instantiation of audio capture device 107, video capture device 105 and audio output device 106 required for the users audio and video interface. In alternate embodiments clients may have one or more instantiations of any type of capture or display device representing the analog or digital inputs and output devices for audio, video or data. FIG. 5 also shows software application code 405D which runs on the PC client 403D as a virtual soft client which connects the application without the need for a hardware concentrator device located at the client device 403D. Connection is preferably made via one or more networks using multicasting virtual private network connection. FIG. 5 illustrates this connection 415D whereby the payload is preferably encrypted by the software 405D running on PC 403D.

Again referring to FIG. 5, a typical embodiment of the invention is shown. FIG. 5 illustrates four remote clients 403A, B, C and D all connected using the public Internet and the method described herein. In one embodiment all these clients are PC computing devices. Alternate embodiments may use client devices such as embedded dedicated terminals, servers, workstations, mobile or wireless devices to achieve the embodiment of the present invention. One or more embodiments of the present invention may use an alternate transport medium such as private, leased lines, switched circuits, Public Telephone System, wired or wireless mediums for payload transport. All payloads transmitted and received to and from client devices are transported and represented in real time full duplex communication mode as known in the art of audio/video data collaboration communications systems. Full Duplex communication is defined as the ability for each local or remote client to see, hear and share data simultaneously (or nearly simultaneous) without disruption to any parties ability to communicate. Alternate embodiments may include two or more clients connected via different types of transport mediums where said one or more clients are configured according to embodiments of the present invention. FIG. 5 describes one such typical configuration. The embodiment of FIG. 5 includes a "soft" client 403D, a single "hard" client 403C connected to a single concentrator device 405C and two additional "hard" clients connected to a single concentrator device 405B. FIG. 5 shows one of many possible configurations for the embodiment. In alternate embodiments, one or more "soft" clients may be connected to one or more other clients where the other clients may be "soft" or "hard" and may be connected through one or more hard concentrator devices. Once multicast group addresses and the virtual tunnels are established by either the "Soft" or "Hard" concentrators, Payload may be transported and forwarded along by each dedicated concentrator. Each concentrator, hard or soft, may determine where the payload is terminated or duplicated for forwarding and which tunnel is suited for best transport of said payload. In one embodiment of the present invention, "soft" clients (405D) emulate the features and functions of a hard concentrator device as software application that runs on the local or remote clients devices. In one embodiment, soft clients may be configured as one or more virtual private network configurations capable of using multicast protocol from one or more soft VPN suppliers where virtual tunnels between one or more client devices may be established. In other embodiments the algorithms of the hard concentrator (FIG. 4) may be contained in software applications that run local to the PC on one or more operating systems. The VPN multicasting protocol may be included in the "soft" client application for proper operation. In alternate embodiments, the soft client application may be split up in separate application code running in one or more locations such as at the local client, remote server, local server or alternatively other local clients.

Again referring to the embodiment of FIG. 5, "hard" concentrators 405A, B and C are hardware device implementations of one embodiment of the present invention. Alternate embodiments may include embedded appliances that also embody hardware according to the present invention. Hard clients 405A, B and C may have one or more client users connected to one or more hard concentrator devices. In alternate embodiments, "soft" clients 403D may be mixed with "hard" clients 403A, B, C in a plethora of possible "hard" and "soft" system configurations. Thus, preferably one or more Internet connections 208 connect directly or indirectly to hard concentrators or soft clients in a plethora of possible connection configurations.

FIG. 5 illustrates one possible connection schema where the Internet cloud 208 may include broadband providers, ISPs, ASPs network providers, local network connections and wide area connections connected in a plethora of network configurations necessary for full duplex payload transport between a multiplicity of clients. As shown in FIG. 5, soft client 403D is connected to audio and video capture devices 107 and 105 respectively and audio output device 106 is connected again to client PC 403D. In the present embodiment, the PC is used for application processing of audio and video. The video display device hardware is connected to the client as known by one knowledgeable in the art. In addition soft client 403D has application software 405D that emulates hard concentrator devices which runs local on soft client 403D. Thus soft client 403D runs the audio processing software including capture, compression, decompression, mixing and audio output in addition to video processing software including video capture, compression, decompression and video output to a display adapter and device known to one knowledgeable in the art.

Again referring to FIG. 5, Internet connection 411D connects the client PC 403D through the Internet 208 to a hard concentrator 405A also connected to the Internet in one or more configurations. In the present embodiment concentrator 405A may be located on a backbone of the Internet network for higher throughput and lower latency. In alternate embodiments concentrators may be located anywhere within the Internet or Intranet network. In a similar method, client 403C runs the audio processing software including capture 107, compression, decompression, mixing and audio output 107 in addition to video processing software including video capture 105/402, compression, decompression and video output to display adapter and display device known to one knowledgeable in the art. In addition, FIG. 5 indicates video capture hardware 402 used to digitize the video input from video capture device 105. Client 403C is connected to the Internet cloud via one or more network connections starting with the local area network 411C which connects in one or more network configurations to hard concentrator 405C which connects in one or more network configurations wide area network systems 411C that interface to the Internet 208. Alternate embodiments may include hardware concentrator 405C connected to one or more hardware concentrators in a plethora of configurations. Thus, the system is scalable in alternate configurations whereby multiple hard and soft concentrators may be used to interface to public Internet, private Intranets or to a mixture of various networks. Thus, alternate embodiments may have a mixture of hard and soft concentrators connected to other network configurations including but not limited to private, switched, wired or wireless broadband or dial-up connections.

Continuing with the description of FIG. 5, FIG. 5 illustrates an embodiment where two clients 403A and 403B are connected to a single hard concentrator device 405B via local network interfaces 310A and 310B each of which are connected through other network gear such as switches 301A and 301B which eventually connect to hard concentrator 405B through network 311. In this example of the present embodiment clients 403A and 403B are actually on separate Local area networks 310A and 310B respectively. Again referring to FIG. 5, hard concentrators 405B and 405C connect to hard concentrator 405A over Internet 208 through LAN or WAN connections 411A, 411B and 41C. Also as indicated in FIG. 5, soft client connects to hard concentrator 405A through LAN or WAN connection 411D. Alternate embodiments the present invention may be network connected in more configurations as known by one knowledgeable in the art.

FIG. 5 indicates the establishment of private tunnels between one or more hard/soft concentrator devices. Client 403A establishes a multicast connection to concentrator 405B via multicast protocol connection 415A. Likewise, client 403B establishes a multicast connection to the same hardware concentrator 405B. Private tunnels may or may not be established until the point at which the payload is processed by one or more concentrators. In one embodiment, one or more private tunnels may be previously established during system network configuration or in alternate embodiments may be instantiated at session instantiation. In the example of FIG. 5, hard concentrator 405B is configured with a private tunnel 415F to hard concentrator 405A and hard concentrator 405C establishes a tunnel 415E to hard concentrator 405A. Soft client 403D using software 405D establishes a tunnel 415D to hard concentrator 405A. Thus, the system of FIG. 5 establishes multiple tunnels to each of hard or soft concentrator devices which are used to establish high quality of service for the transport of audio, video and data (payload) between multiple local or remote clients across public or private networks.

In one embodiment, multicast group addresses are typically established by a central server responsible for the authenticity and tracking of clients as they enter and leave a particular meeting room or session. These multicast group addresses are transported to clients interested in joining a session or meeting room by the server. Transfer of group addresses is preferably done through established private tunnels. In alternate embodiments the transfer of group addresses by the central server device may be done outside the private tunnels during session or meeting room instantiation. Local clients are responsible for informing upstream concentrators of particular interest in particular multicast groups they wish to join. Concentrators listen for multicast addresses that are of interest to particular clients which typically are located on the same network or sub-network as the concentrator. Thus, media and data payloads may be forwarded by concentrators to clients that are interested in the reception of payload data with particular multicast group addresses. Concentrators without local client interest in payload delivery may copy and or forward multicast payload to other concentrators located along the established virtual private network.

The present invention comprises various embodiments of a process and method for the delivery of media payload over secure private networks whereby the deliver of such payload consumes less bandwidth due to the encapsulation of payload in a multicast environment. In alternate environments payloads may be under transport in both multicast and unicast protocol formats and may or may not be transported in virtual private tunnels such that a mix of the methods described herein and that known in the art may be used.

We claim:

1. A method for data transport that uses multicast protocols, the method comprising:

initiating multicast routing instance of ingress or egress nodes of at least one virtual private networks, wherein each payload data is forwarded along a network where at least one client indicates interest in at least one multicast group address;

creating at least one virtual private network with routing protocols on ends of each of a plurality of virtual private network tunnels;

associating the multicast group address with the data payload and routing the data payload to multiple clients through the virtual private network tunnels, wherein the data payload is routed such that each tunnel node in a data payload route is multicast enabled;

communicating a plurality of multicast addressed packets that are encapsulated within a private tunnel such that each tunnel node is specified as a multicast enabled router with specific instructions to construct and to maintain each virtual tunnel for payload transport;

enabling each multicast router to instantiate a plurality of virtual private network tunnels between a plurality of creation points and a plurality of termination points between a public network and a private network;

transporting the real-time data payload between the public network and the private network; and performing tunnel creation and tear-down that is initiated by a software application running on a client device.

2. The method of claim 1, wherein the data payload is not processed, compressed, decompressed, encrypted, decrypted or manipulated during transport.

3. The method of claim 1 wherein the plurality of private network tunnels encompass hardware multicast routers.

4. The method of claim 1 further comprising encrypting the application data payload during communications with the public network.

5. The method of claim 1 further comprising enabling at least one server to instantiate one or more communication channels.

6. A real time multipoint communications system that uses multicast protocols, the system comprising:
- a multicast routing instance of ingress or egress nodes of at least one virtual private networks, wherein each payload data is forwarded along a network where at least one client indicates interest in at least one multicast group address;
- at least one virtual private network comprising a plurality of private network tunnels, a multitask protocol applied to each port of each tunnel;
- a multicast group address associated with the data payload, the data payload routed to multiple clients via the virtual private network tunnels;
- a data payload route through the virtual private network tunnels comprising a plurality of tunnel nodes, each tunnel node of the route multicast enabled;
- a plurality of multicast addressed packets that are encapsulated within a private tunnel such that each tunnel node is specified as a multicast enabled router with specific instructions to construct and to maintain each virtual tunnel for payload transport;
- each multicast router configured to instantiate a plurality of virtual private network tunnels between a plurality of creation points and a plurality of termination points between a public network and a private network; and
- a software application running on a client device configured to initiate tunnel creation and tear-down.

7. The system of claim 6, wherein the data payload is not processed, compressed, decompressed, encrypted, decrypted or manipulated during transport.

8. The system of claim 6 wherein the plurality of private network tunnels encompass hardware multicast routers.

9. The system of claim 6, wherein the data payload is encrypted during communications with the public network.

10. The system of claim 6, further comprising at least one server configured to to instantiate one or more communication channels.

* * * * *